J. Burt.

Potato Digger.

Nº 82,592.  Patented Sep. 29, 1868.

Witnesses:
J. Alfred Ellis
J. V. White

Inventor:
John Burt.
Per
J. H. Alexander
Atty.

United States Patent Office.

JOHN BURT, OF STURGIS, MICHIGAN.

Letters Patent No. 82,592, dated September 29, 1868.

IMPROVEMENT IN POTATO-DIGGER.

The Schedule referred to in these Letters Patent and making part of the same.

TO ALL WHOM IT MAY CONCERN:

Be it known that I, JOHN BURT, of Sturgis, in the county of St. Joseph, and State of Michigan, have invented certain new and useful Improvements in Potato-Digger; and I do hereby declare that the following is a full, clear, and exact description thereof, reference being had to the accompanying drawings, and to the letters of reference marked thereon, which form a part of this specification, in which—

Figure 1:
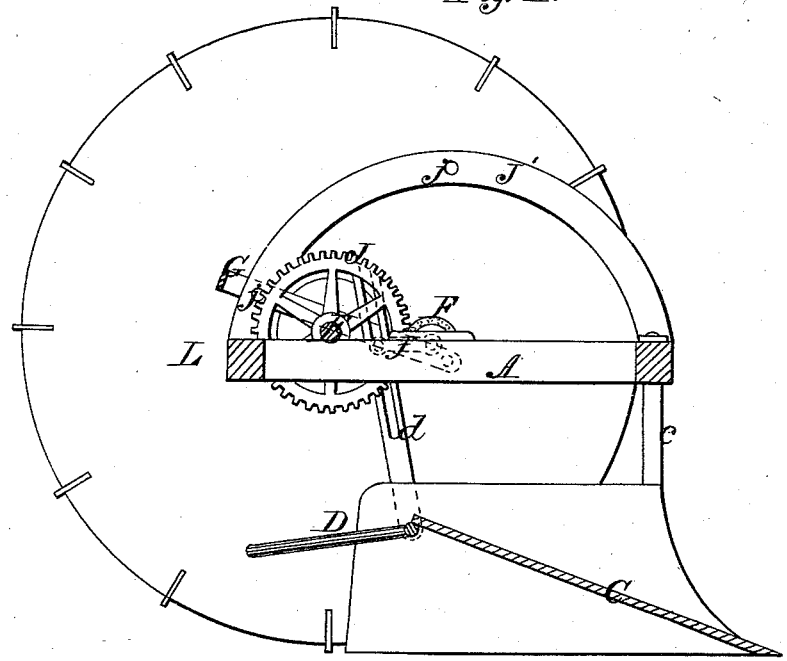

Figure 1 represents a vertical central section of my machine, and

Figure 2:
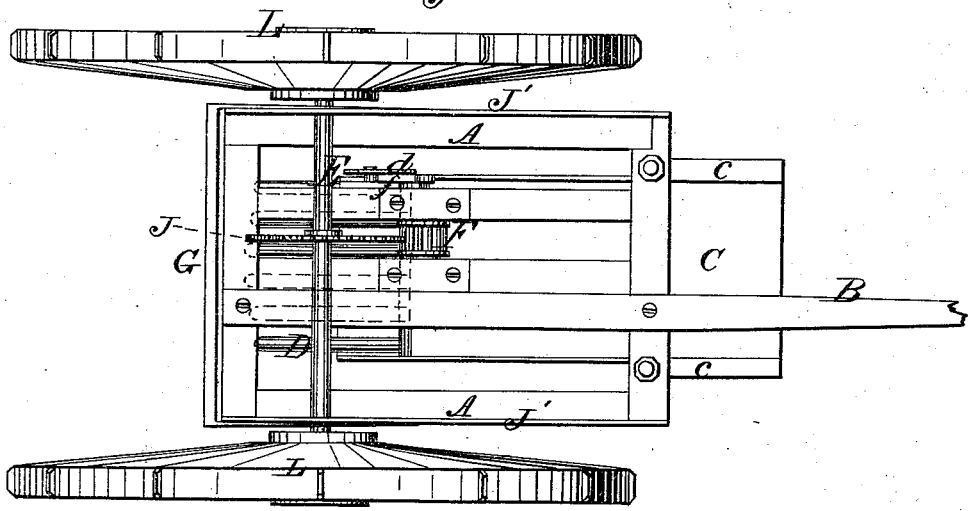

Figure 2 a plan view of the same.

The object of my invention is to provide a simple, cheap, and effective means for digging potatoes, and separating the dirt therefrom after being dug; and the nature of it consists in the employment of such devices as will be hereinafter described.

To enable others skilled in the art to make and employ my invention, I will now describe its construction and operation.

In the accompanying drawings, A represents a frame, provided on its upper side with the tongue B.

C designates the shovel or digger, constructed as shown in fig. 1, and provided with arms or standards, c, passing up through the front end or bar of frame A, and secured therein by nuts. Pivoted to the upper rear end of digger C, and between its sides, is the shaker or sifter D, which consists of a horizontal bar, having teeth or prongs projecting therefrom. The object of this shaker is to separate the dirt from the potatoes after having been dug from the ground by the digger, upon which they are fed to said shaker or sifter.

d designates a metal bar, securely fastened to the outer end of the horizontal bar of shaker D, and projecting outwards and upwards a short distance above the top of frame A, at which point, or thereabouts, it is slotted, as shown in fig. 1, which will be referred to more fully hereafter.

F designates a lantern-wheel, secured upon a shaft, having its bearings in bars of frame A. To one end of the shaft of wheel F is securely attached a crank, f, having its outer end fitting into and sliding up and down in the slotted end of bar d.

E represents the axle, having its bearings in a metal bar, G, bent down at right angles at its ends, and pivoted or hinged to the sides of frame A.

Upon axle E is secured a gear-wheel, J, which gears with wheel F, and by means of which motion is communicated to said wheel, which will operate the crank, f, and the crank, f, sliding up and down in the slotted bar d, will cause said bar to have a vibrating motion, and it being attached to shaker D, will give it a like motion, which will cause the dirt adhering to the potatoes when on the shaker to be separated therefrom.

J' designates metal plates, made semicircular in form, and secured to the sides of the frame A. These plates are provided with adjusting-holes, j, by means of which the bar G, when raised or lowered, depressing or elevating the axle and its wheels L, may be securely held at the desired point, the bar G being likewise supplied with holes, to correspond with those of plates J'.

The wheels L are provided on their periphery with bevelled metal projections or plates, which will assist the wheels in operating the machine while passing over the ground.

What I claim, and desire to secure by Letters Patent, is—

1. The combination of bar G, semicircular plates J', provided with adjusting-holes j and frame A, all arranged as described, for the purpose of regulating the depth of the shovel.

2. The shaker D, shovel C, slotted arm d, crank, f, pinion F, gear-wheel J, and axle E, all combined and arranged substantially in the manner and for the purpose set forth.

In testimony that I claim the foregoing as my own, I affix my signature in presence of two witnesses.

JOHN BURT.

Witnesses:
EDMUND S. AMIDON, Jr.,
BRACEY TOBEY.